(12) United States Patent
Newman

(10) Patent No.: US 8,225,750 B2
(45) Date of Patent: Jul. 24, 2012

(54) TOY AND TREAT DISPENSER

(76) Inventor: Michael Joseph Newman, Sherman Oaks, CA (US)

( * ) Notice: Subject to any disclaimer, the term of this patent is extended or adjusted under 35 U.S.C. 154(b) by 61 days.

(21) Appl. No.: 12/658,912

(22) Filed: Feb. 18, 2010

(65) Prior Publication Data

US 2010/0242857 A1 Sep. 30, 2010

Related U.S. Application Data

(60) Provisional application No. 61/163,134, filed on Mar. 25, 2009.

(51) Int. Cl.
*A01K 15/02* (2006.01)

(52) U.S. Cl. ..................................... 119/707; 119/51.01

(58) Field of Classification Search ............... 119/51.01, 119/57.91, 61.1, 702, 707, 708, 709, 711; A01K 1/10, 5/00, 39/00, 1/00, 15/02, 29/00

See application file for complete search history.

(56) References Cited

U.S. PATENT DOCUMENTS

| | | | | |
|---|---|---|---|---|
| 3,204,608 A * | 9/1965 | Snitz | | 119/54 |
| 4,267,799 A * | 5/1981 | Bacon | | 119/61.2 |
| 6,273,027 B1 * | 8/2001 | Watson et al. | | 119/712 |
| 7,458,336 B2 * | 12/2008 | Eu | | 119/51.02 |
| 2004/0040519 A1 * | 3/2004 | Rucker et al. | | 119/707 |
| 2005/0263082 A1 * | 12/2005 | Rutledge | | 119/51.01 |

* cited by examiner

*Primary Examiner* — Son T Nguyen
*Assistant Examiner* — Thien Thanh Pham
(74) *Attorney, Agent, or Firm* — Klarquist Sparkman, LLP

(57) ABSTRACT

A dispenser for a toy and treats and a method for using the dispenser are disclosed. The dispenser contains an enclosure having a funnel at the top, an opening at the bottom of one of the enclosure walls, a treat dispenser containing treats having at least one hole from which the treats can exit, a ramp that directs the toy and treats to exit the enclosure and a support for the funnel and treat dispenser. The pet is encouraged to drop the toy into the enclosure through the funnel. The toy bounces off the treat dispenser causing it to release treats through the hole at the bottom of the dispenser. The toy and the treats roll out the opening encouraging the pet to further interact with the dispenser for fun and exercise.

10 Claims, 3 Drawing Sheets

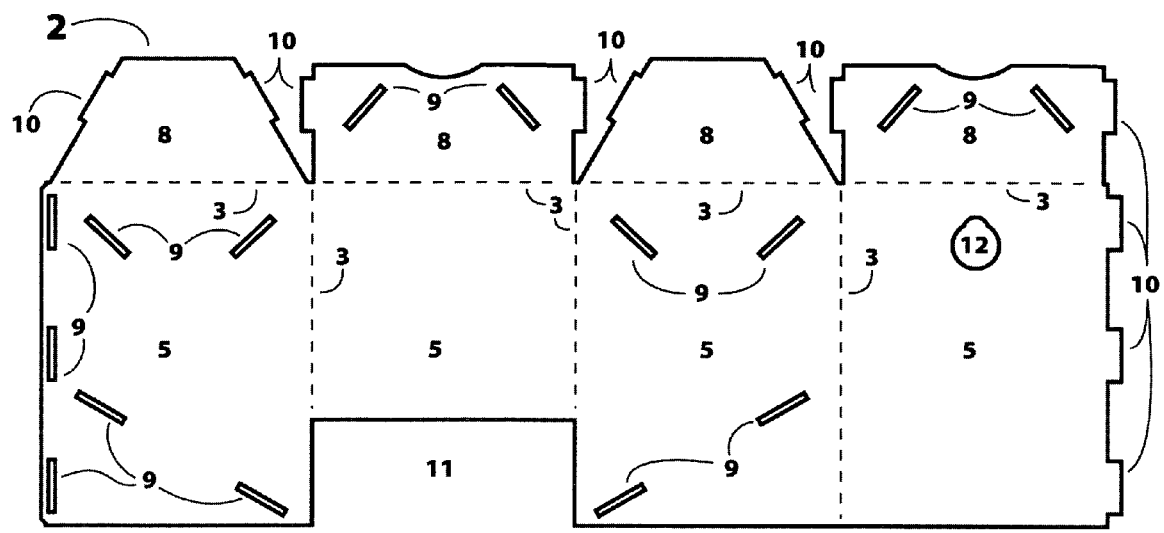
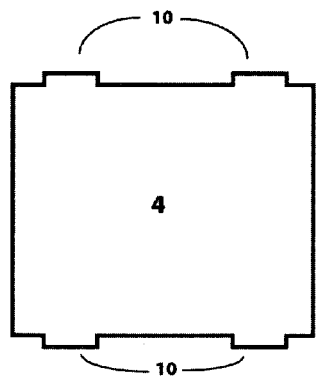
FIG. 1
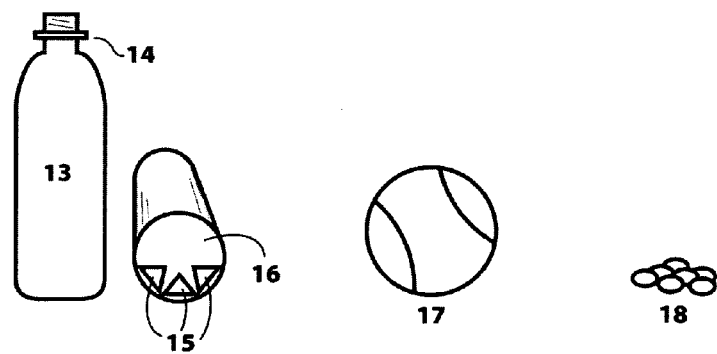

Step 1　　　Step 2　　　Step 3　　　Step 4

TOY AND TREAT DISPENSER

I am claiming the benefit of the filing date of provisional application No. 61/163,134 filed on Mar. 25, 2009.

BACKGROUND OF THE INVENTION

The present invention generally relates to a toy and treat dispenser for household pets and, more specifically, to a tennis ball and treat dispenser that provide fun and exercise for dogs.

Canines and other pets are often bored and lack positive mental and physical challenges.

As can be seen, there is a need for a game that provides both fun and exercise for pets.

SUMMARY OF THE INVENTION

In one aspect of the present invention, a toy and treat dispenser comprising: an enclosure having four walls, a top, and an interior; a funnel contained in the top of the enclosure; an opening in a bottom side of a first wall of the enclosure; a treat dispenser having a neck and a bottom, said neck being disposed in an opening in a top side of a second wall of the enclosure, said second wall being in a position opposite to the first wall, said bottom of the treat dispenser hanging in the interior of the of the enclosure, said bottom of the treat dispenser containing at least one hole, said bottom of the treat dispenser also containing treats; a ramp disposed in the interior of the enclosure in a manner that directs toys dropped into the enclosure and treats out of the opening in a bottom side of a first wall of the enclosure; and a support for the funnel and treat dispenser.

In another aspect of the present invention, a method for engaging a pet in exercise and fun activity comprising: placing a toy into an enclosure through a funnel; bouncing the toy against a treat dispenser; releasing treats from the treat dispenser; rolling the toy and treats out of the enclosure on a ramp through an opening in a wall of the enclosure; recovering the toy for later use; and providing the treats to the pet.

These and other features, aspects and advantages of the present invention will become better understood with reference to the following drawings, description and claims.

BRIEF DESCRIPTION OF THE DRAWINGS

FIG. 1 is an exploded view of the dispenser components according to an embodiment of the present invention.

DETAILED DESCRIPTION OF THE INVENTION

Figure 2:
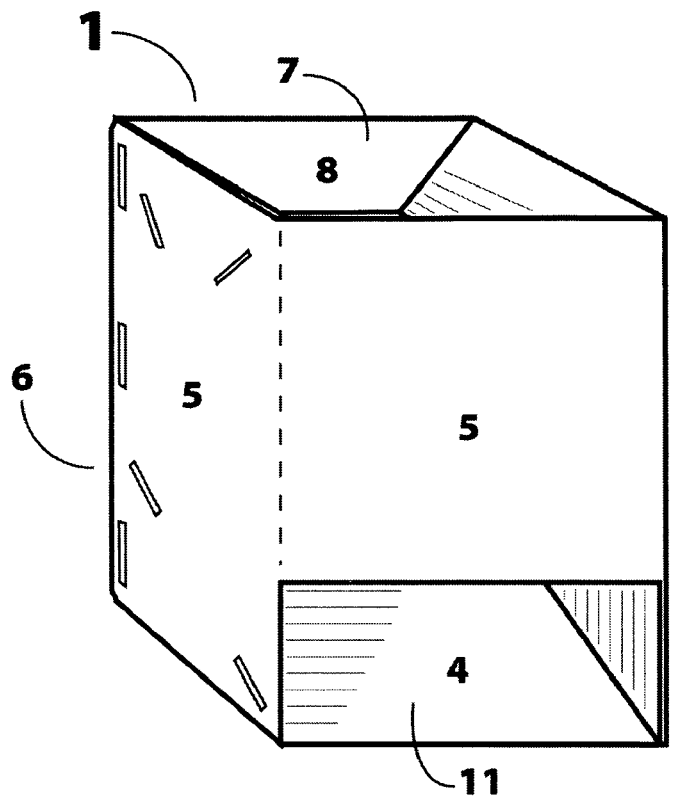
FIG. 2 is a front perspective view of the device according to an embodiment of the present invention.
Figure 3:
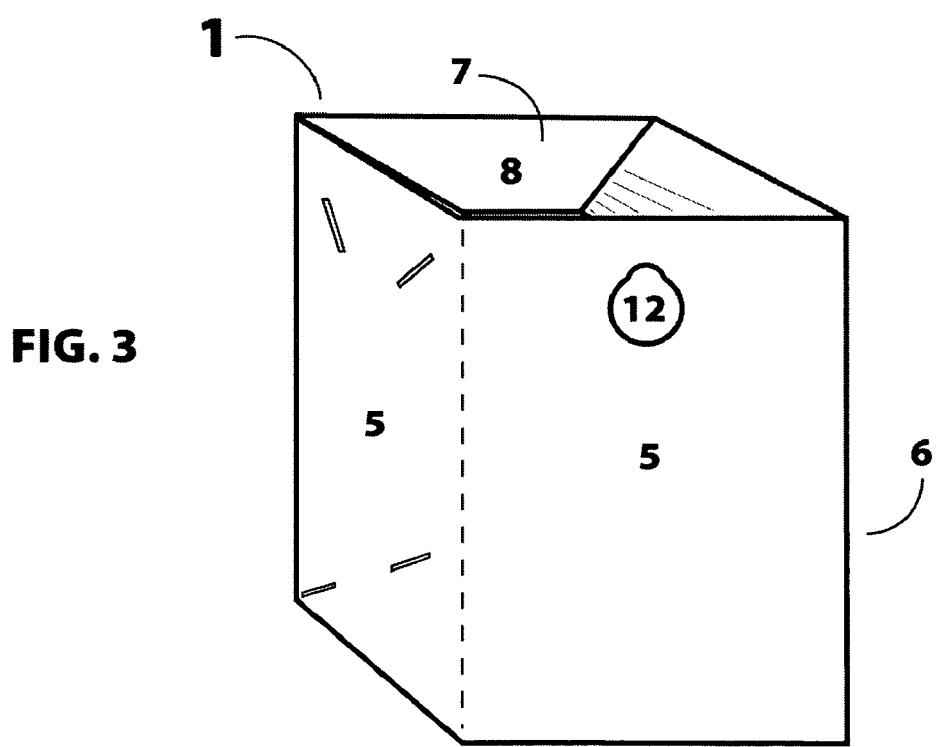
FIG. 3 is a rear perspective view of the device according to an embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Broadly, an embodiment of the present invention generally relates to a pet toy and treat dispenser that engages a pet, such as a canine, a feline or a monkey, in an interactive fashion.

Embodiments of the present invention are illustrated in FIGS. 1-5.

The dispenser 1 is a device configured and designed to allow a pet to drop a standard tennis ball 17 into the funnel 7 upon which it is automatically returned with pet treats 18. The outer structure 2 is the frame of the dispenser 1. The outer structure 2 is cut from a thin, semi-rigid material such as cardboard or plastic. Scoring 3 allows the outer structure 2 to fold and form the vertical walls 5, funnel walls 8 and funnel 7.

The tabs 10 and slots 9 of the outer structure 2 connect the vertical walls 5, funnel walls 8 and return ramp 4 together without glue, adhesives or fasteners. The vertical walls 5 of the outer structure 2 provide support for the funnel 7, treat dispenser 13 and return ramp 4. The funnel 7 is the tennis ball 17 input device. The funnel 7 directs the tennis ball 17 into the outer structure 2, into contact with the treat dispenser 13 and onto the return ramp 4.

Figure 4:
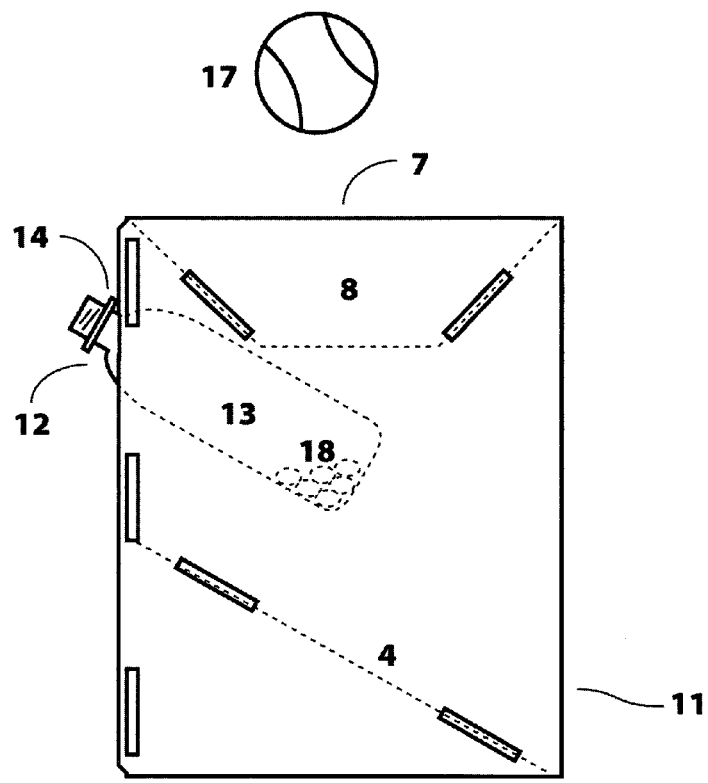
FIG. 4 is a side perspective view of the device according to an embodiment of the present invention.

The treat dispenser 13 is a 16.9 ounce plastic water bottle mounted in a cantilevered manner as shown in FIG. 4, which houses and dispenses the pet treats 18. Treat holes 15 in the dispenser bottom 16 allow the pet treats 18 to be released from the treat dispenser 13. The pet treats 18 are pieces of any variety of dry pet food smaller than 0.5 inch in diameter The treat dispenser 13 is connected to the outer structure 2 by insertion into the treat dispenser slot 12 and overlapping the flange 14 onto the vertical wall 5. The treat dispenser slot 12 is 1.75 inches in diameter with a 0.75 inch diameter extension protruding 0.25 inch from the top.

Figure 5:
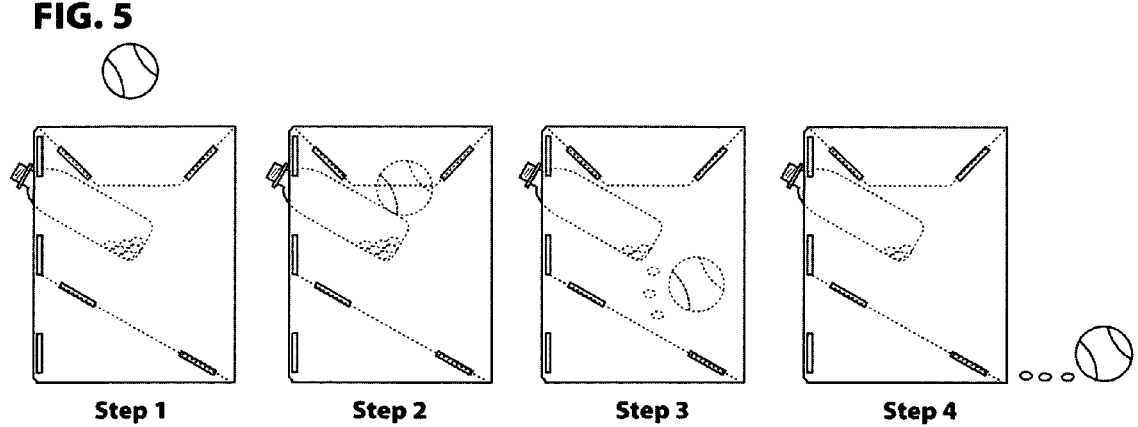
FIG. 5 is an illustration of the method for using the dispenser according to an embodiment of the present invention.

The method for using the invention is detailed in FIG. 5 on page 3 of the invention drawings. Pet treats 18 are placed in the treat dispenser 13. The tennis ball 17 is dropped into the funnel 7 through which it passes and strikes the treat dispenser 13 causing vibration. The vibration loosens the pet treats 18 of which a random amount fall through the treat holes 15. Gravity forces the tennis ball 17 and pet treats 18 onto the return ramp 4 and momentum causes both to travel out the return opening 11.

The outer structure 2 is folded along the scoring 3 at 90 degree angles to form the vertical walls 5. The vertical walls 5 connect by inserting the tabs 10 into the corresponding slots 9 to form the vertical structure 6.

The funnel walls 8 are folded along the scoring 3 into the vertical structure 6 at a 44 degree angle. The funnel walls 8 connect to the vertical walls 5 by inserting the tabs 10 into the corresponding slots 9.

The return ramp 4 is connected to the vertical walls 5 of the vertical structure 6 at a 30 degree angle by inserting the return ramp 4 tabs 10 in the corresponding slots 9 on the vertical structure 6. Treat holes 15 in the dispenser bottom 16 of the treat dispenser 13 allow pet treats 18 to be dispensed. The treat dispenser 13 is connected to the vertical structure 6 by inserting it into the treat dispenser slot 12. The flange 14 overlaps the treat dispenser slot 12 and the treat dispenser 13 is wedged against the funnel wall 8.

The outer structure 2 and vertical walls 5 support the funnel 7, treat dispenser 13, and return ramp 4. The treat dispenser slot 12 positions the treat dispenser 13 beneath the funnel 7 in such a way that when the tennis ball 17 is dropped into the funnel 7 it will come in contact with treat dispenser 13. Upon contact the treat dispenser 13 will vibrate and release the pet treats 18 through the treat holes 15. The return ramp 4 is supported and positioned by its tabs 10 and the slots 9 in the vertical walls 5 at such an angle that causes the falling tennis ball 17 and pet treats 18 to exit the outer structure 2 through the return opening 11 by their own momentum.

To make this invention one needs the outer structure 2, return ramp 4, a treat dispenser 13 (16.9 ounce plastic water bottle), tennis ball 17 and pet treats 18. These elements are connected to produce the pet treat machine 1 as shown in the invention drawings.

One would use the invention by filling the treat dispenser 13 with pet treats 18 and placing the pet treat machine 1 on the ground with the funnel 7 facing upwards. The individual would then train a pet to pick up the tennis ball 17 and drop it into the funnel 7. Optionally one could drop the tennis ball 17 into the funnel 7 if the pet was unable, unwilling or not there to participate.

It should be understood, of course, that the foregoing relates to exemplary embodiments of the invention and that modifications may be made without departing from the spirit and scope of the invention as set forth in the following claims.

I claim:

1. A treat dispenser comprising:
    an enclosure having a plurality of sides, a top, and an interior;
    a first opening in the top of the enclosure;
    a second opening in a first side of the enclosure;
    a treat container having a treat-containing portion configured to hold treats and a wall-engaging portion engages with a third opening in a second side of the enclosure, the wall-engaging portion engaging the third opening to pivotably mount the treat container on the second side in a cantilevered manner, the treat-containing portion of the treat dispenser having at least one treat-dispensing opening through which treats can be dispensed;
    wherein the treat container is movably mounted on the second side wall and positioned below the first opening in the top of the enclosure so that contact with a toy dropped into the first opening will cause the treat container to vibrate, and the at least one treat-dispensing opening being located in the treat-containing portion of the treat dispenser so that the vibration of the treat container can cause some of the treats to fall through the at least one treat-dispensing opening and be dispensed out the second opening in the first side of the enclosure.

2. The treat dispenser of claim 1, further comprising a ramp disposed in the interior of the enclosure to direct treats dispensed through the at least one treat-dispensing opening out of the treat dispenser through the second opening in the first side of the enclosure.

3. The treat dispenser of claim 2, wherein the ramp is supported at one or more of the plurality of sides.

4. The treat dispenser of claim 1, wherein the first side of the enclosure is located generally opposite to the second side of the enclosure.

5. The treat dispenser of claim 1, wherein the wall-engaging portion extends through the third opening in the second side of the enclosure so that at least a portion of the wall-engaging portion is outside of the enclosure.

6. The treat dispenser of claim 5, wherein the wall-engaging portion comprises a flange that overlaps an outer surface of the second side adjacent the third opening to mount the treat dispenser on the second side of the enclosure.

7. The treat dispenser of claim 5, wherein the treat dispenser comprises a bottle, with the wall engaging portion comprising a neck of the bottle and the treat-containing portion comprising a main body of the bottle.

8. The treat dispenser of claim 1, wherein the plurality of sides comprises four distinct side wall members.

9. The treat dispenser of claim 8, further comprising a plurality of tabs and slots formed on at least some of the side wall members,
    wherein the tabs are configured to engage with respective plurality of slots to connect two or more side wall members together and form the enclosure.

10. The treat dispenser of claim 1, wherein the first opening is formed by a funnel.

\* \* \* \* \*